(12) United States Patent
Brinda

(10) Patent No.: US 10,477,006 B2
(45) Date of Patent: Nov. 12, 2019

(54) METHOD, VIRTUAL REALITY SYSTEM, AND COMPUTER-READABLE RECORDING MEDIUM FOR REAL-WORLD INTERACTION IN VIRTUAL REALITY ENVIRONMENT

(71) Applicant: HTC Corporation, Taoyuan (TW)

(72) Inventor: David Brinda, Bellevue, WA (US)

(73) Assignee: HTC Corporation, Taoyuan (TW)

( * ) Notice: Subject to any disclaimer, the term of this patent is extended or adjusted under 35 U.S.C. 154(b) by 9 days.

(21) Appl. No.: 15/410,773

(22) Filed: Jan. 20, 2017

(65) Prior Publication Data

US 2017/0214782 A1 Jul. 27, 2017

Related U.S. Application Data

(60) Provisional application No. 62/281,745, filed on Jan. 22, 2016, provisional application No. 62/281,746, filed on Jan. 22, 2016.

(51) Int. Cl.
*G06T 11/60* (2006.01)
*H04M 1/725* (2006.01)
(Continued)

(52) U.S. Cl.
CPC ........ *H04M 1/72527* (2013.01); *G06F 3/012* (2013.01); *G06F 3/016* (2013.01);
(Continued)

(58) Field of Classification Search
CPC .......... G06F 3/012; G06F 3/013; G06F 3/016; G06F 3/011; G06F 3/04815;
(Continued)

(56) References Cited

U.S. PATENT DOCUMENTS

2009/0083678 A1 3/2009 Fitzmaurice et al.
2010/0005480 A1 1/2010 Mallempati et al.
(Continued)

FOREIGN PATENT DOCUMENTS

CN 103207677 7/2013
CN 104238738 12/2014
(Continued)

OTHER PUBLICATIONS

"Office Action of Taiwan Counterpart Application," dated Jun. 19, 2018, pp. 1-10.
(Continued)

*Primary Examiner* — Nitin Patel
*Assistant Examiner* — Amen Woldesenbet Bogale
(74) *Attorney, Agent, or Firm* — JCIPRNET

(57) ABSTRACT

The disclosure provides a method, a virtual reality system, and a computer-readable recording medium for real-world interaction in a virtual reality environment. The method is applicable to a virtual reality system having a virtual reality headset and a controller, wherein the virtual reality system may receive data from a processing device, and the method includes the following steps. An event signal is triggered on at least one of the virtual reality headset and the controller by the processing device, where the event signal is received from the processing device and the event signal indicates an arrival of a notification associated with a real world. Motion data is generated by the controller. Whether the motion data matches first motion data is determined. If so, a first interaction interface is generated and at least one of the virtual reality headset and the controller is allowed to interact with the notification.

18 Claims, 6 Drawing Sheets

(51) Int. Cl.
  *G06F 3/01* (2006.01)
  *G06F 3/16* (2006.01)
  *G06F 3/0346* (2013.01)
  *G06F 3/0488* (2013.01)
(52) U.S. Cl.
  CPC ............ *G06F 3/017* (2013.01); *G06F 3/0346* (2013.01); *G06F 3/167* (2013.01); *G06T 11/60* (2013.01); *H04M 1/72555* (2013.01); *G06F 3/04886* (2013.01); *G06T 2200/24* (2013.01); *H04M 2250/12* (2013.01)
(58) Field of Classification Search
  CPC .... G06F 2203/012–015; G06T 19/006; H04N 13/332; G02B 27/017
  See application file for complete search history.

(56) References Cited

U.S. PATENT DOCUMENTS

| | | | |
|---|---|---|---|
| 2012/0302289 | A1 | 11/2012 | Kang |
| 2014/0361976 | A1* | 12/2014 | Osman ............... G02B 27/0172 345/156 |
| 2014/0364197 | A1* | 12/2014 | Osman ............... A63F 13/00 463/24 |
| 2015/0049113 | A1* | 2/2015 | Rahman ............... G06T 19/006 345/633 |
| 2016/0124499 | A1* | 5/2016 | Shiu ............... G06F 3/011 715/778 |
| 2017/0251148 | A1* | 8/2017 | He ............... G06F 3/005 |

FOREIGN PATENT DOCUMENTS

| | | |
|---|---|---|
| CN | 104281260 | 1/2015 |
| CN | 104618712 | 5/2015 |
| CN | 104793731 | 7/2015 |
| TW | 200729062 | 8/2007 |
| WO | 2015102464 | 7/2015 |

OTHER PUBLICATIONS

"Office Action of China Counterpart Application", dated Jun. 4, 2019, p. 1-p. 11.

* cited by examiner

METHOD, VIRTUAL REALITY SYSTEM, AND COMPUTER-READABLE RECORDING MEDIUM FOR REAL-WORLD INTERACTION IN VIRTUAL REALITY ENVIRONMENT

CROSS-REFERENCE TO RELATED APPLICATION

This application claims the priority benefits of U.S. provisional application Ser. No. 62/281,745, filed on Jan. 22, 2016 and U.S. provisional application Ser. No. 62/281,746, filed on Jan. 22, 2016. The entirety of the above-mentioned patent applications is hereby incorporated by reference herein and made a part of this specification.

TECHNICAL FIELD

The disclosure relates to a method, a virtual reality system, and a computer-readable recording medium for real-world interaction in a virtual reality environment.

BACKGROUND

Virtual reality creates an illusion of reality with realistic images, sounds, and other sensations that replicate a real environment or an imaginary setting. A virtual reality environment would offer a user immersion, navigation, and manipulation that simulate his physical presence in the real world or imaginary world.

An initial focus on the development would enable the user to be fully immersed in a virtual reality experience with no distraction from the outside world. However, as communication services have proliferated, people tend to constantly communicate with each other through phone calls, internet calls, SMS messages, in-app messages, and so forth. At this point, locking oneself away in the virtual reality environment could be challenging and unrealistic.

SUMMARY OF THE DISCLOSURE

Accordingly, the disclosure relates to a method, a virtual reality system, and a computer-readable recording medium for real-world interaction in a virtual reality environment, which not only obviates a complete isolation from the real world, but also provides an approach to bridging between the real and virtual world with minimal friction and distraction.

According to one of the exemplary embodiments, the method is applicable to a virtual reality system having a virtual reality headset and a controller, wherein the virtual reality system may receive data from a processing device, and the method includes the following steps. An event signal is triggered on at least one of the virtual reality headset and the controller by the processing device, where the event signal is received from the processing device and the event signal indicates an arrival of a notification associated with a real world. Motion data is generated by the controller. Whether the motion data matches first motion data is determined. If so, a first interaction interface is generated and at least one of the virtual reality headset and the controller is allowed to interact with the notification.

According to one of the exemplary embodiments, the virtual reality system includes a virtual reality headset and a controller, where the virtual reality headset and the controller are connected to a processing device. An event signal indicating an arrival of a notification associated with a real world is received from the processing device and triggered on at least one of the virtual reality headset and the controller, and a first interaction interface is generated in response to motion data generated by the controller is determined to be matching first motion data, wherein the first interaction interface is for at least one of the virtual reality headset and the controller to interact with the notification.

According to one of exemplary embodiments, the computer-readable recording medium records computer program to be loaded into a processing device in a virtual reality system to execute the steps of the aforementioned method.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
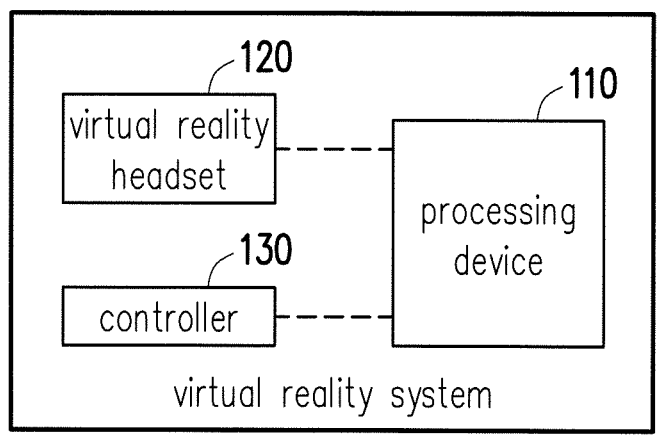
FIG. 1 illustrates a schematic diagram of a proposed virtual reality system in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a proposed virtual reality system in accordance with one of the exemplary embodiments of the disclosure. All components of the virtual reality system and their configurations are first introduced in FIG. 1. The functionalities of the components are disclosed in more detail in conjunction with FIG. 2.

Referring to FIG. 1, an exemplary virtual reality system 100 would at least include a processing device 110, a virtual reality headset 120, and a controller 130, where the processing device 110 would be connected to the virtual reality headset 120 and the controller 130.

The processing device 110 may be, for example, a computing device (e.g. a file server, a database server, an application server, a workstation, a personal computer, a laptop computer) with computing capability and include a processor. The processor may be one or more of a North Bridge, a South Bridge, a field programmable array (FPGA), a programmable logic device (PLD), an application specific integrated circuit (ASIC), or other similar device or a combination thereof The processor may also be a central processing unit (CPU), a programmable general purpose or special purpose microprocessor, a digital signal processor (DSP), a graphics processing unit (GPU), or other similar device or a combination thereof The processing device 110 would generate images that replicate a real environment or create an imaginary setting with stereoscopic visual effect as well as communicate with the virtual reality headset 120 and the controller 130 that allows the user to navigate and interact with such virtual world. In some instances, the processing device 110 would also generate sound effects to provide a more immersive and realistic experience for the user.

For illustrative purposes, the processing device 110 may be integrated with the virtual reality headset 120 or wired/wireless connect with the virtual reality headset 112.

It should be appreciated that the processing device 110 would include a data storage device in various forms of non-transitory, volatile, and non-volatile memories which would store buffered or permanent data as well as compiled programming codes used to execute functions of the processing device 110. In some instances, the data storage device may also be external to and accessible by the processing device 110 such as an external hard drive, cloud storage, or other external recording devices.

The virtual reality headset 120 would be a head-mounted display or goggles with a build-in head-tracking system. The virtual reality headset 110 at least includes an integrated display, a motion sensor, and a communication interface. The display may be a liquid crystal display (LCD), a light-emitting diode (LED) display, or the like. The motion sensor may be one or a combination of an accelerometer (e.g. G-sensor), a gyroscope (e.g. gyro-sensor), or any sensor that detects the linear movement, the direction of the linear movement, or the rotational movement (e.g. rotational angular velocity or rotational angle) of the virtual reality headset 120. The virtual reality headset 120 would output the sensed data to the processing device 110 through the communication interface either through wire or wireless transmission as known per se, and the processing device 110 would return images to be displayed on the display of the virtual reality headset 120. In some instances, the virtual reality headset 120 may further include a headphone which plays audio signals transmitted from the processing device 110.

The controller 130 would be an input device such as a handheld controller equipped with a motion sensor, a mouse, a joystick, a trackball, a touch pad, and/or buttons that permits the user to interact with environment, objects, or avatars in the virtual world. For illustrative purposes, the controller 130 would be a wireless handheld controller that communicates with the processing device 110 and/or virtual reality headset 120 via any wireless standard.

In one exemplary embodiment, the virtual reality system 100 would include at least one locator. The locator may be, for example, a laser or an infrared transmitter and receiver which is wall-mounted or placed at a corner of the user's playing space. The locator would not only map where the virtual reality headset 120 and the controller 130 are, but would also define boundaries of the playing space to prevent the user from bumping into walls or collisions with physical objects while in the virtual world.

Figure 2:
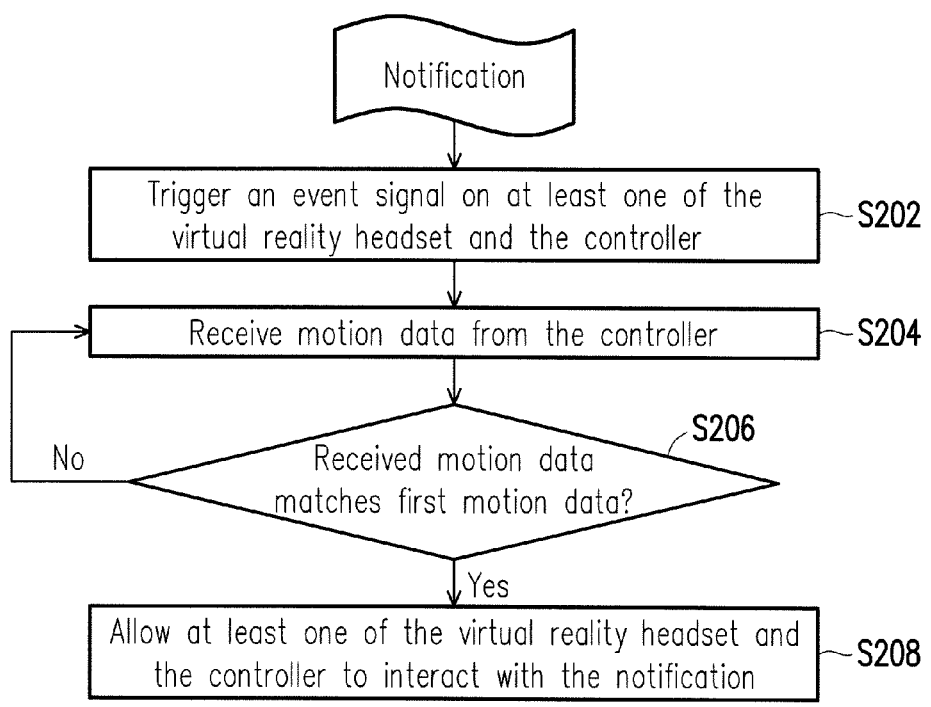
FIG. 2 illustrates a proposed method for real-world interaction in a virtual reality environment in accordance with one of the exemplary embodiments of the disclosure.

FIG. 2 illustrates a proposed method for real-world interaction in a virtual reality environment in accordance with one of the exemplary embodiments of the disclosure. The steps of FIG. 2 could be implemented by the proposed virtual reality system 100 as illustrated in FIG. 1.

Referring to FIG. 2 in conjunction with FIG. 1, when a notification associated with a real world arrives, the processing device 110 would trigger an event signal on at least one of the virtual reality headset 120 and the controller 130 (Step S202). Herein, the notification could be an SMS message, an in-app message, an instant message, an e-mail message, or other forms of communication known in the art. The event signal indicates an arrival of the notification so that the user is informed in the virtual reality environment. The event signal could be haptic feedback generated by the controller 130, a sound effect or a visual effect generated by the virtual reality headset 120, and so forth. In some embodiments, the virtual reality headset 120 may have a build-in speaker or wired/wireless connected to an earphone, and the sound effect can be heard by the user through the speaker or the earphone.

Figure 3:
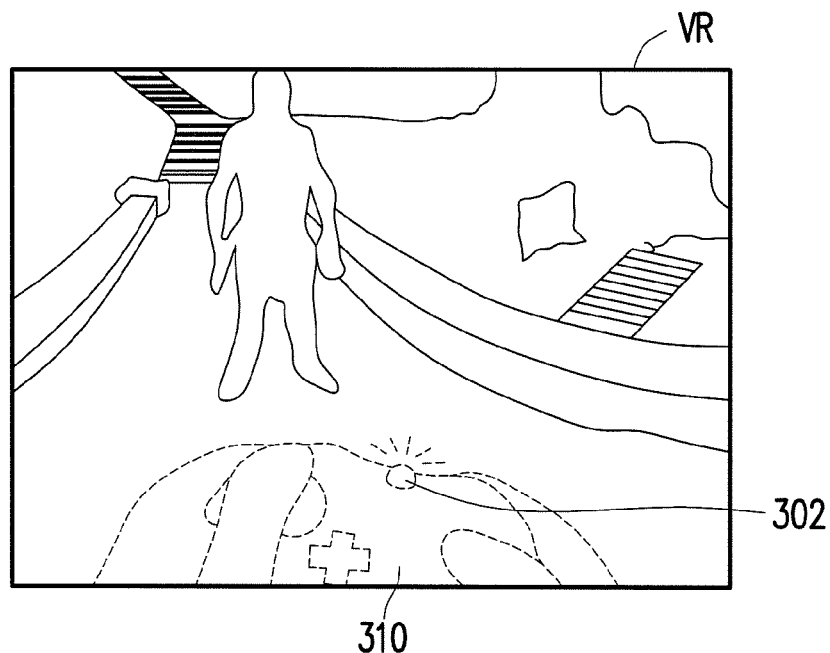
FIG. 3 illustrates a scenario where a notification arrives in accordance with one of the exemplary embodiments of the disclosure.

For example, FIG. 3 illustrates a scenario where a notification arrives in accordance with one of the exemplary embodiments of the disclosure. Referring to FIG. 3, when the notification arrives, the user may perceive an actual haptic sensation and hear an audio chime in a virtual reality environment VR. Meanwhile, when the user looks down or the user raise the controller, an on-screen controller 310 with a light effect 302 would appear in his view. Such effect would be tracked from where the controller 130 appears in the physical space and is just an indication so as not to interrupt game play, but alert the user to a notification. Alternatively, an icon related to content of the notification could also be displayed at a corner of his view. The disclosure is not limited in this regard.

Referring back to FIG. 2, the processing device 110 would receive motion data from the controller 130 (Step S204). In detail, the controller 130 would constantly detect the presence of the motion that is indicative of itself being moved. Once the motion is detected, the controller 130 would generate and transmit the motion data corresponding to the movement of the controller 130 to the processing device 110. It should be noted that, prior to the detection of any motion, the processing device 110 may provide the user to define motion gestures associated with certain actions of the controller 130. In other words, the controller 130 may generate the motion data upon the detection of the motion, and the processing device 130 may map the motion data to a certain action as well as store the motion data in a motion database. Alternatively, the motion data in the motion database may be system default settings. The motion data may include locations, patterns, traces, accelerations, and so forth. In the present exemplary embodiment, the defined motion data includes first motion data and second motion data respectively correspond to an enablement and disablement of the interaction with the notification.

Next, the processing device 110 would determine whether the received motion data matches the first motion data (Step S206) within some tolerance level. In response to the received motion data determined to be not matching the first motion data, it may be possible that the user is still using the controller 130 for other purposes and would like to ignore the notification at this moment. The flow would return to Step S204 such that the processing device 110 would continue to receive the motion data from the controller 130.

On the other hand, in response to the received motion data determined to be matching the first motion data, the processing device 110 would allow at least one of the headset 120 and the controller 130 to interact with the notification (Step S208). That is, in response to a successful validation of the received motion data, the processing device 110 would allow the user to interact with the notification associated with the real world through the headset 120 and/or the controller 130 within the context of the virtual reality environment, for example, by generating a first interaction interface. Hence, the user would be provided a feeling of complete immersion with a certain degree of connection to the real world.

Figure 4:
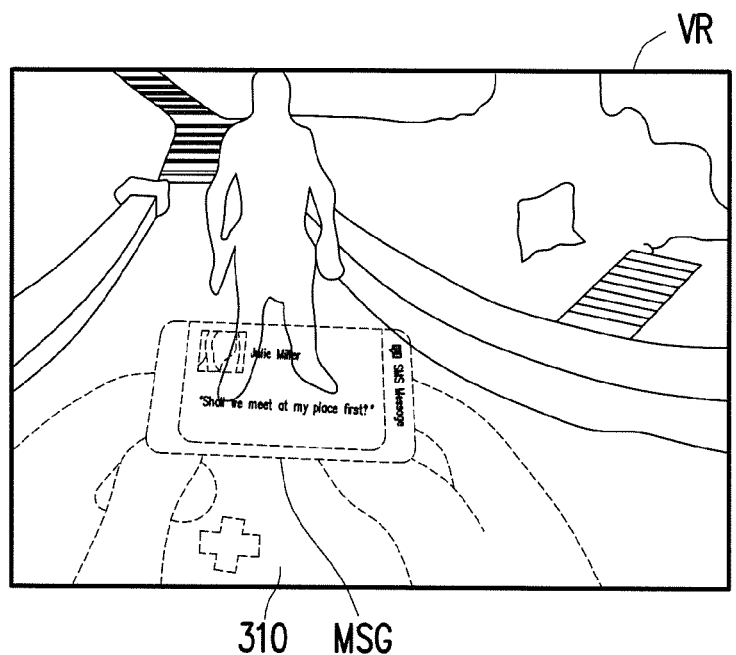
FIG. 4 illustrates an interaction with a notification in accordance with one of the exemplary embodiments of the disclosure.

For example, FIG. 4 illustrates an interaction with a notification in accordance with one of the exemplary embodiments of the disclosure. Assume that the notification is a message, and the first motion data and the second motion data are respectively in associated with a lift-up motion and a lower-down motion of the controller 130.

Referring to FIG. 4, when the user wishes to preview a notification, he may lift the controller 130 to make the on-screen controller 310 prominent within the view. Once the processing device 110 validates the motion data received from the controller 130, it would control the virtual reality headset 120 to display the notification (i.e. a message MSG) in the virtual reality environment VR. Meanwhile, the physical position of the controller 130 is still being tracked. In the present exemplary embodiment, the on-screen controller 310 and the notification MSG would be translucent, and the controller 130 would continue to direct the actions within the virtual reality environment VR. In other words, the progress, for example playing game, in the virtual world would be still continuing at this point, and the controller 130 would be still able to interact with virtual objects and avatars.

Once the user is done with reading the notification MSG, he may dismiss the notification MSG by lowering down the controller 130. From another point of view, when the notification is displayed, the processing device 110 would concurrently receive motion data from the controller 130 and determine whether the received motion data matches the second motion data within some tolerance level. In response to the received motion data determined to be matching the second motion data, the processing device 110 would dismiss the notification MSG from the virtual reality environment VR. As such, the user does not need to abandon the virtual reality environment VR to access the content of the notification.

Figure 5:
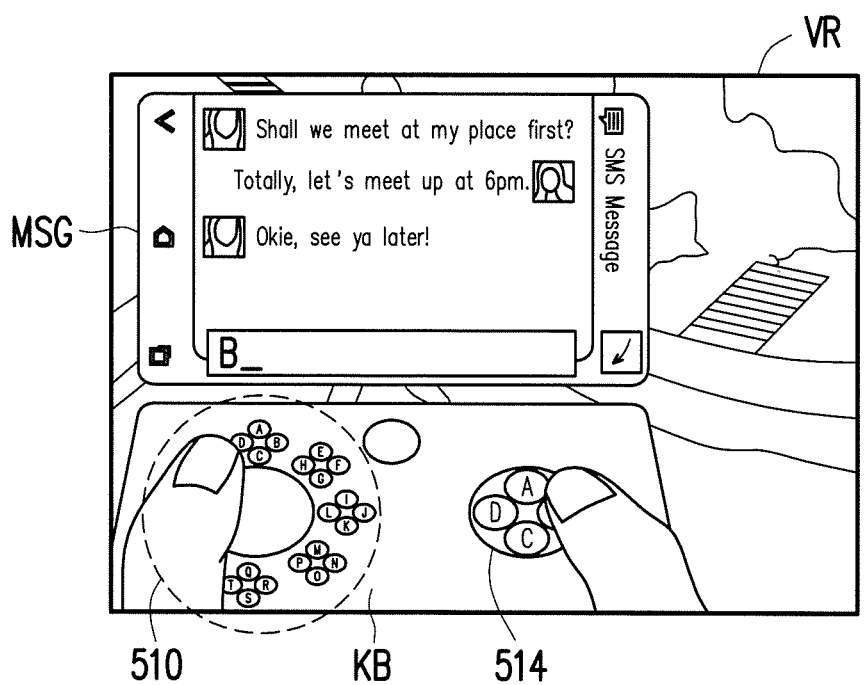
FIG. 5 illustrates an interaction with a notification in accordance with another one of the exemplary embodiments of the disclosure.

FIG. 5 illustrates an interaction with a notification in accordance with another one of the exemplary embodiments of the disclosure. In this instance, the user is able to reply to the notification through the controller 130.

Referring to FIG. 5, continuing from FIG. 4, when the notification MSG is displayed in the virtual reality environment VR, the user may choose to reply to the notification MSG by, for example, pressing a button on the controller 130, and a first trigger signal would then be generated and transmitted to the processing device 110. In response to the received first trigger signal, the processing device 110 would pause the progress in the virtual reality environment VR and direct the controller 130 to interact with the notification MSG.

In the present exemplary embodiment, the processing device 110 would control the virtual reality headset 120 to display the notification MSG as well as a second interaction interface, for example a virtual keyboard KB and/or other input methods, corresponding to the controller 130. The virtual keyboards may have different types and arrangements for different languages and different arrangements for one language for the user to select. The arrangement of alphabetic keys 510 of the virtual keyboard KB may map to physical buttons and/or a touch pad of the controller 130 for intuitive text input. For example, when the user presses a button of the controller 130 that maps to the keys A~D among the alphabetic keys 510, keys A~D would be displayed for selection at selection keys 514. When the user presses a button of the controller 130 that maps to the key B among the selection keys 514, the letter 'B' would be a text input to the notification MSG. Once the user is done with the conversation, the user may dismiss the notification MSG by, for example, pressing the same button on the controller 130, and a second trigger signal would then be generated and transmitted to the processing device 110. In response to the received second trigger signal, the notification MSG as well as the virtual keyboard KB would be no longer displayed, and the processing device 110 would resume the progress in the virtual reality environment VR and direct the controller 130 to interact with the virtual reality environment VR as it did before the notification appeared.

Since the user herein is provided with easy access to the notification without exiting the current virtual reality environment, the user may want as few distractions as possible in order to maintain the illusion of virtual world. Herein, a smooth transition between the virtual reality environment and the notification would be provided so that the user is able to switch between states without a jarring shift in context.

Take FIG. 5 as an example, when the notification MSG is displayed and the progress in the virtual reality environment VR is paused, the processing device 110 may take a snapshot of the field of view of the current virtual space. Next, the processing device 110 may blur the snapshot and control the headset 120 to display the blurred snapshot as a background of the notification, so that the user may see a flat 2D blurred snapshot floating in the 3D space of the virtual reality environment. Once the notification MSG is dismissed, the original virtual reality environment VR would resume as it did before the notification appeared.

In a more visualized fashion, FIGS. 6A-6D illustrate the transition between a virtual reality environment and a notification in accordance with another one of the exemplary embodiments of the disclosure.

Figure 6A:
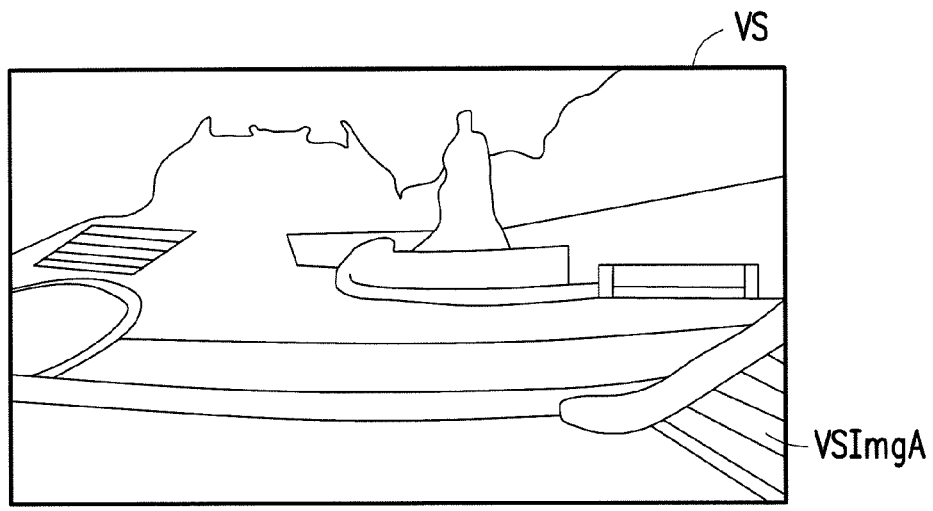
FIGS. 6A-6D illustrate the transition between a virtual reality environment and a notification in accordance with one of the exemplary embodiments of the disclosure.
Figure 6B:
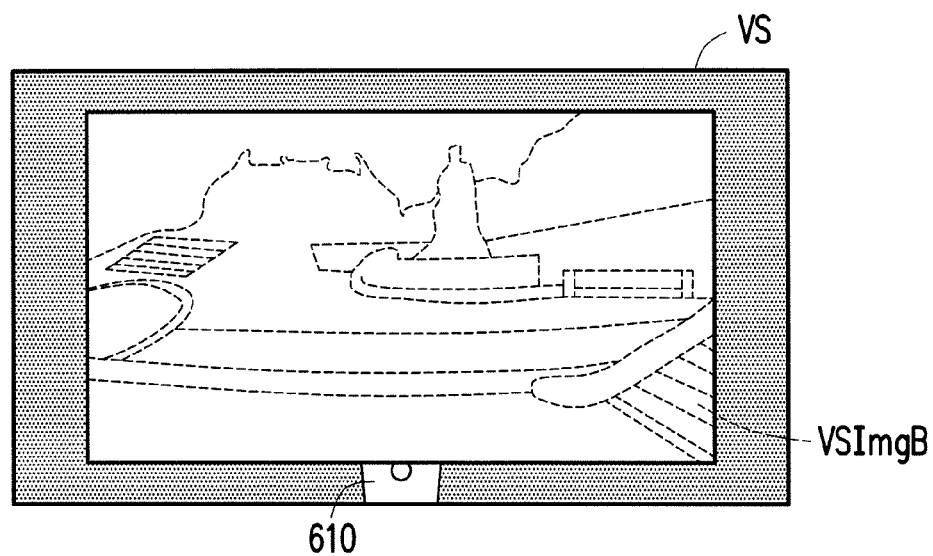
Figure 6C:
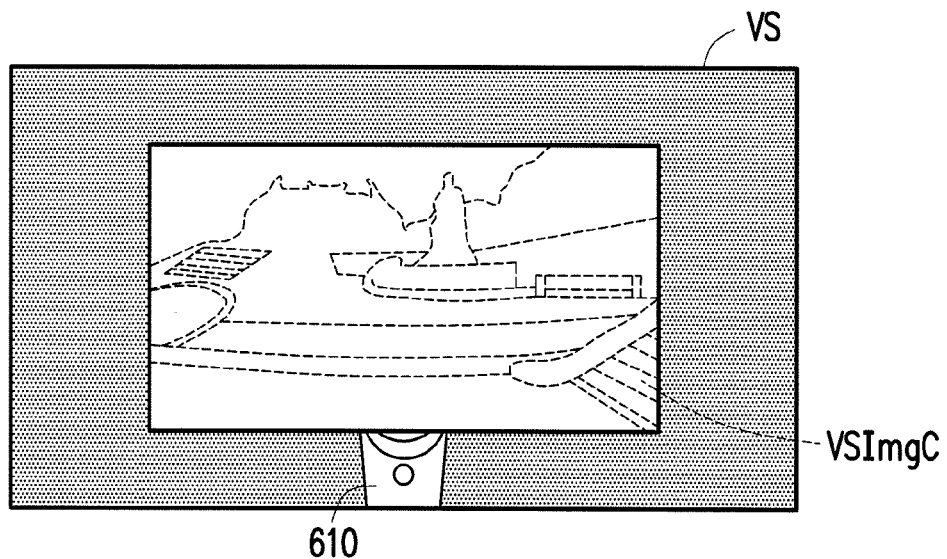

Referring first to FIG. 6A, when the progress in a virtual reality environment VS is paused, a snapshot VSImgA of the current virtual space is taken. Meanwhile, the functionality of the controller 130 would be changed from interacting with virtual objects and avatars to interacting with a notification. Such change may be expressed by fading an on-screen controller from its current appearance to a representation of a physical controller 610 and by blurring the snapshot VSImgA to generate a blurred snapshot VSImgB as illustrated in FIG. 6B. In the present exemplary embodiment, the blurred snapshot VSImgB could be scaled to a minified snapshot VSImgC and the representation of the physical controller 610 could gradually appear as illustrated in FIG. 6C. Once the representation of the physical controller 610 entirely appears, it indicates that the controller 130 would be able to interact with the notification. A screenshot of the user's point of view may become a complete representation of the physical controller 610, a minified snapshot VSImgC, and the notification therebetween.

Figure 6D:
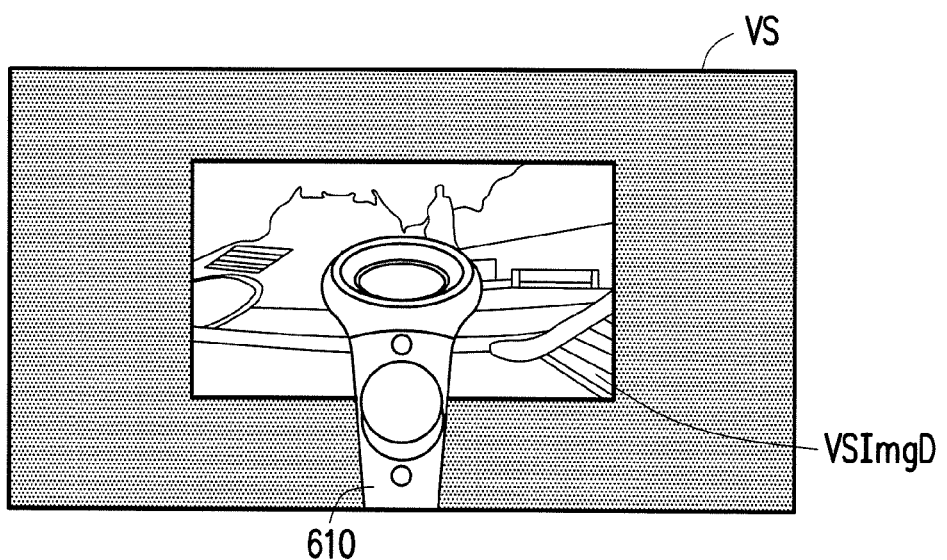

When the user finishes with the notification, the minified snapshot VSImgC would switch to an active space window VSImgD as illustrated in FIG. 6D that may fade into the overall virtual reality environment VS, and the representation of the physical controller 610 may change back into the on-screen controller as previously presented. It should be noted that, such concept may be extended to interfaces, models, interactions other than the notification such as a menu setting window. The disclosure is not limited in this regard.

Revisiting FIG. 2, the notification referred in Step S208 is not limited to the message. In another exemplary embodiment, the notification could also be an incoming call via telecommunication services or Internet phone services. In one example, once the processing device 110 determines that the received motion data matches the first motion data in Step S206, the processing device 110 may allow the user to answer the incoming call through the virtual reality headset 120. In another example, once the processing device 110 determines that the received motion data matches the first motion data in Step S206, the processing device 110 may first control the virtual reality headset 120 to display a description of the incoming call such as caller ID, and the user may choose to answer the incoming call by, for example, pressing a button on the controller 130, and a first trigger signal would then be generated and transmitted to the processing device 110. In response to the received first trigger signal, the processing device 110 would pause the progress in the virtual reality environment and direct the virtual reality headset 120 to answer the incoming call. In a similar fashion, the processing device 110 may optionally pause the virtual reality environment while the user is answering the incoming call and resume the progress in the virtual reality environment when the call ends. In still another exemplary embodiment, the notification could also be a missed call notification, social network event notification, news notification, a notification from service application, a warning notification, etc.

The disclosure also provides a non-transitory computer readable recording medium, which records computer program to be loaded into a processing device in a virtual reality system to execute the steps of the proposed method. The computer program is composed of a plurality of program instructions (e.g. an organization chart, establishing program instruction, a table approving program instruction, a setting program instruction, and a deployment program instruction). Once the program sections are loaded into the processing device and executed by the same, the steps of the proposed method would be accomplished.

In view of the aforementioned descriptions, the proposed method, virtual reality system, and computer-readable recording medium allow an incoming notification to appear within the context of the virtual reality environment with minimal intrusion. Others would still able to reach the user in the virtual reality without pulling him out of the experience, and the user would able to move between the real and virtual world with minimal friction by performing designated actions on the controller without removing the virtual reality headset. The disclosure not only obviates a complete isolation from the real world, but also provides an elegant approach to bridging between the real and virtual world.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for real-world interaction in a virtual reality environment, applicable to a virtual reality system comprising a virtual reality headset and a controller, wherein the virtual reality system receives data from a processing device, and the method comprises steps of:

an event signal is triggered on at least one of the virtual reality headset and the controller in response to an arrival of a notification associated with a real world, wherein data of the event signal received from the processing device and the event signal indicates the arrival of the notification;

generating motion data of a first movement of the controller after the event signal is triggered;

in response to the motion data determined to be matching first motion data corresponding to an enablement of interaction with the notification, a first interaction interface is generated, by the virtual reality headset, for at least one of the virtual reality headset and the controller to interact with the notification in the virtual reality environment, and displaying a content of the notification in the first interaction interface, wherein in response to a first trigger signal received from the controller, a second interaction interface is generated for the controller to interact with the notification in the virtual reality environment, wherein a reply of the content of the notification is inputted through the second interaction interface;

generating another motion data of a second movement of the controller after displaying the content of the notification; and in response to the another motion data determined to be matching second motion data corresponding to a disablement of interaction with the notification, dismissing all of the first interaction interface and the second interaction interface from the virtual reality environment by the virtual reality headset.

2. The method according to claim 1, wherein the step of an event signal is triggered on at least one of the virtual reality headset and the controller comprises:
generating a sound effect on the virtual reality headset.

3. The method according to claim 1, wherein the step of an event signal is triggered on at least one of the virtual reality headset and the controller comprises:
generating a visual effect on the virtual reality headset.

4. The method according to claim 1, wherein the notification is a message, and wherein the content of the notification is displayed by the virtual reality headset to be viewed by an user in the virtual reality environment.

5. The method according to claim 4, wherein the second interaction interface is generated for the controller to interact with the notification so as to allow the user to reply the message.

6. The method according to claim 5, wherein the step of a second interaction interface is generated for the controller to interact with the notification comprises:
displaying a virtual keyboard corresponding to the controller on the virtual reality headset.

7. The method according to claim 5, wherein the method further comprises:
in response to a second trigger signal received from the controller, dismissing the notification and the controller is directed to interact with the virtual reality environment.

8. The method according to claim 5, wherein in response to the first trigger signal received from the controller, the method further comprises:
a snapshot of a current virtual space of the virtual reality environment is taken and then blurred to generate a blurred snapshot; and
displaying the blurred snapshot as a background of the notification in a paused progress of the virtual reality environment.

9. The method according to claim 1, wherein the notification is an incoming call, and wherein the method further comprises:
answering the incoming call by the virtual reality headset.

10. A virtual reality system for real-world interaction in a virtual reality environment comprising:
a virtual reality headset; and
a controller;
wherein, the virtual reality headset and the controller connected to a processing device, and wherein an event signal indicating an arrival of a notification is received from the processing device and triggered on at least one of the virtual reality headset and the controller in response to the arrival of the notification associated with a real world, and a first interaction interface is generated, by the virtual reality headset, in response to motion data of a first movement of the controller generated by the controller after the event signal is triggered is determined to be matching first motion data corresponding to an enablement of interaction with the notification, wherein the first interaction interface is for at least one of the virtual reality headset and the controller to interact with the notification in the virtual reality environment, and a content of the notification is displayed in the first interaction interface,
wherein, in response to a first trigger signal received from the controller, a second interaction interface is generated for the controller to interact with the notification in the virtual reality environment,
wherein, a reply of the content of the notification is inputted through the second interaction interface,
wherein, another motion data of a second movement of the controller is generated by the controller after displaying the content of the notification, and
in response to the another motion data determined to be matching second motion data corresponding to a disablement of interaction with the notification, all of the first interaction interface and the second interaction interface are dismissed from the virtual reality environment by the virtual reality headset.

11. The virtual reality system according to claim 10, wherein the event signal comprises at least one of haptic feedback, a sound effect, and a visual effect.

12. The virtual reality system according to claim 10, wherein the notification is a message, and wherein the content of the notification is displayed by the virtual reality headset to be viewed by an user in the virtual reality environment.

13. The virtual reality system according to claim 12, wherein the second interaction interface is generated for the controller to interact with the notification so as to allow the user to reply the message.

14. The virtual reality system according to claim 13, wherein a virtual keyboard corresponding to the controller is displayed on the virtual reality headset.

15. The virtual reality system according to claim 13, wherein the notification is dismissed and the controller is directed to interact with the virtual reality environment in response to a second trigger signal received from the controller.

16. The virtual reality system according to claim 13, wherein in response to the first trigger signal received from the controller, a snapshot of a current virtual space of the virtual reality environment is taken and then blurred to generate a blurred snapshot, and the blurred snapshot is displayed as a background of the notification in a paused progress of the virtual reality environment.

17. The virtual reality system according to claim 10, wherein the notification is an incoming call, and wherein the virtual reality headset is further configured to answer the incoming call.

18. A non-transitory computer readable recording medium, recording a program to be loaded by a processing device in a virtual reality system to execute steps of:
triggering an event signal on at least one of a virtual reality headset and a controller in response to an arrival of a notification associated with a real world by the processing device, wherein the event signal indicates the arrival of the notification;
receiving motion data of a first movement of the controller from the controller by the processing device;
determining whether the received motion data matches first motion data corresponding to an enablement of interaction with the notification by the processing device;
in response to the received motion data determined to be matching the first motion data, allowing at least one of the virtual reality headset and the controller to interact with the notification in the virtual reality environment by the processing device, and displaying a content of the notification in a first interaction interface, wherein in response to a first trigger signal received from the controller, a second interaction interface is generated for the controller to interact with the notification in the virtual reality environment, wherein a reply of the content of the notification is inputted through the second interaction interface;

generating another motion data of a second movement of the controller by the controller after displaying the content of the notification; and in response to the another motion data determined to be matching second motion data corresponding to a disablement of interaction with the notification, dismissing all of the first interaction interface and the second interaction interface from the virtual reality environment by the virtual reality headset.

\* \* \* \* \*